(12) United States Patent
Oestreich et al.

(10) Patent No.: US 9,598,057 B2
(45) Date of Patent: Mar. 21, 2017

(54) DUAL-SPEED AUTO-SHIFT LANDING GEAR

(71) Applicant: Jost International Corp., Grand Haven, MI (US)

(72) Inventors: Brian E. Oestreich, Grand Haven, MI (US); Kyle William Nordling, Columbus, IN (US); Ben Madsen, Woodbury, MN (US); Steven Johns, Oshkosh, WI (US); Minglei Guan, Houghton, MI (US)

(73) Assignee: Jost International Corp., Grand Haven, MI (US)

( * ) Notice: Subject to any disclaimer, the term of this patent is extended or adjusted under 35 U.S.C. 154(b) by 299 days.

(21) Appl. No.: 14/096,731

(22) Filed: Dec. 4, 2013

(65) Prior Publication Data
US 2014/0157917 A1   Jun. 12, 2014

Related U.S. Application Data

(60) Provisional application No. 61/733,245, filed on Dec. 4, 2012.

(51) Int. Cl.
*F16H 59/14* (2006.01)
*B60S 9/08* (2006.01)

(52) U.S. Cl.
CPC ............ *B60S 9/08* (2013.01); *F16H 2718/18* (2013.01); *Y10T 74/18784* (2015.01)

(58) Field of Classification Search
CPC ...... B60S 9/00; B60S 9/02; B60S 9/04; B60S 9/06; B60S 9/08; B66F 7/24
(Continued)

(56) References Cited

U.S. PATENT DOCUMENTS 2,232,187 A * 2/1941 Reid .................. B60D 1/66
254/419
2,464,890 A * 3/1949 Premo ................ F16H 3/54
254/419
(Continued)

FOREIGN PATENT DOCUMENTS

CN 101808866 B 6/2012
DE 19616704 10/1997
(Continued)

OTHER PUBLICATIONS

International Search Report completed Mar. 11, 2014, from corresponding International Application No. PCT/US2013/073134.
(Continued)

*Primary Examiner* — Joseph J Hail
*Assistant Examiner* — Tyrone V Hall, Jr.
(74) *Attorney, Agent, or Firm* — Gardner, Linn, Burkhart & Flory, LLP

(57) ABSTRACT

A multi-speed landing gear for a trailer includes a housing and a telescoping leg connected with the housing, and a gear assembly for extending and retracting the leg. The gear assembly includes a ring gear arranged to rotate about an axis transverse to the telescopic orientation of the leg member with the gear assembly configured to operate in a high speed setting and a low speed setting and automatically shift between the high and low speed settings, with an actuator selectively preventing or allowing rotation of the ring gear to enable the gear assembly to operate in the low speed setting or the high speed setting. The actuator may be connected to a shift member, with the actuator causing the shift member to selectively prevent or allow rotation of the ring gear by way of engagement of the shift member with the ring gear.

24 Claims, 18 Drawing Sheets

(58) Field of Classification Search
USPC .................................. 254/418–420, 424, 425
See application file for complete search history.

(56) References Cited

U.S. PATENT DOCUMENTS

| | | | | |
|---|---|---|---|---|
| 2,959,395 | A | | 11/1960 | Strack et al. |
| 3,007,677 | A | * | 11/1961 | Dalton ..................... B60S 9/06 254/419 |
| 3,136,527 | A | * | 6/1964 | Griffis ..................... B60D 1/66 254/419 |
| 3,764,162 | A | * | 10/1973 | Rawlings ................. B60S 9/04 280/764.1 |
| 3,791,664 | A | | 2/1974 | Self et al. |
| 3,888,464 | A | | 6/1975 | Felsen |
| 3,927,863 | A | | 12/1975 | Polsky |
| 4,847,960 | A | * | 7/1989 | Hafla ....................... B23B 3/162 29/40 |
| 5,118,082 | A | * | 6/1992 | Byun ....................... B66F 3/20 254/102 |
| 5,238,266 | A | | 8/1993 | VanDenberg |
| 5,538,225 | A | | 7/1996 | VanDenberg |
| 5,542,647 | A | * | 8/1996 | Huetsch ................... B60S 9/08 254/103 |
| 5,676,018 | A | | 10/1997 | VanDenberg |
| 6,224,103 | B1 | | 5/2001 | Hatcher |
| 6,260,882 | B1 | | 7/2001 | Kingsbury |
| 6,261,199 | B1 | * | 7/2001 | Schlangen ............... F16H 1/32 475/163 |
| 6,598,886 | B2 | | 7/2003 | Baird et al. |
| 6,893,006 | B2 | | 5/2005 | Drake, III |
| 6,994,325 | B2 | | 2/2006 | Riedl |
| 7,083,196 | B2 | | 8/2006 | Riedl |
| 7,163,207 | B2 | | 1/2007 | Baird et al. |
| 7,296,779 | B2 | | 11/2007 | Bakshi et al. |
| 7,325,786 | B2 | * | 2/2008 | Drake, III ................ B60S 9/08 254/419 |
| 7,377,488 | B2 | | 5/2008 | Schutt |
| 7,380,825 | B2 | | 6/2008 | Peveler |
| 7,398,959 | B2 | | 7/2008 | VanDenberg et al. |
| 7,575,249 | B2 | | 8/2009 | Riedl |
| 8,051,545 | B2 | | 11/2011 | Peveler |
| 8,382,069 | B2 | | 2/2013 | Alguera et al. |
| 2004/0159827 | A1 | * | 8/2004 | Drake, III ................ B60S 9/08 254/425 |
| 2006/0043717 | A1 | | 3/2006 | Baxter |
| 2008/0146397 | A1 | | 6/2008 | Drake |
| 2012/0037862 | A1 | | 2/2012 | McCarthy et al. |

FOREIGN PATENT DOCUMENTS

| | | |
|---|---|---|
| DE | 10017495 | 2/2002 |
| EP | 401 101 A1 | 12/1990 |
| EP | 2233376 B1 | 2/2012 |
| JP | 3-31044 | 2/1991 |
| JP | 8-268240 A | 10/1996 |
| JP | 09071226 A | 3/1997 |
| JP | 2005280389 A | 3/2004 |
| WO | 99/54178 | 10/1999 |
| WO | 2004/096606 | 11/2004 |
| WO | 2004/098965 | 11/2004 |
| WO | 2009/074001 A1 | 6/2009 |
| WO | 2012/072389 | 6/2012 |

OTHER PUBLICATIONS

Written Opinion of the International Searching Authority for International Application No. PCT/US2013/073134.

* cited by examiner

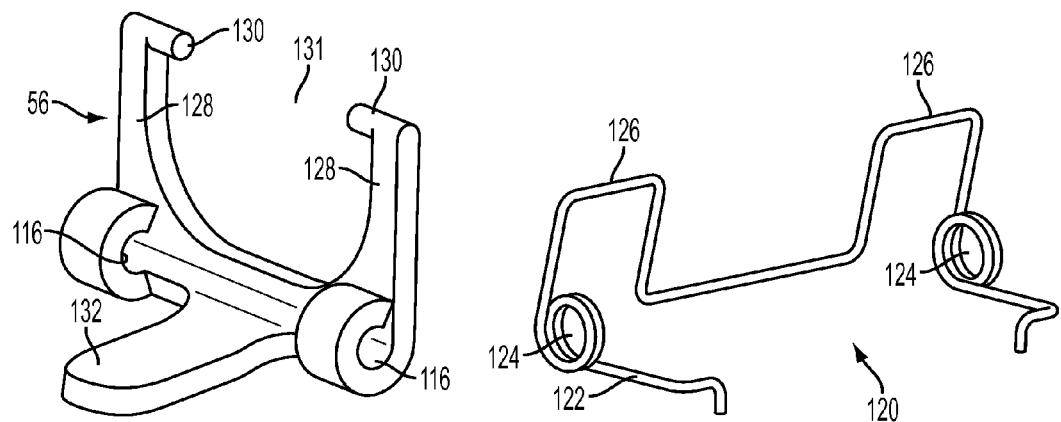
FIG. 7
FIG. 8
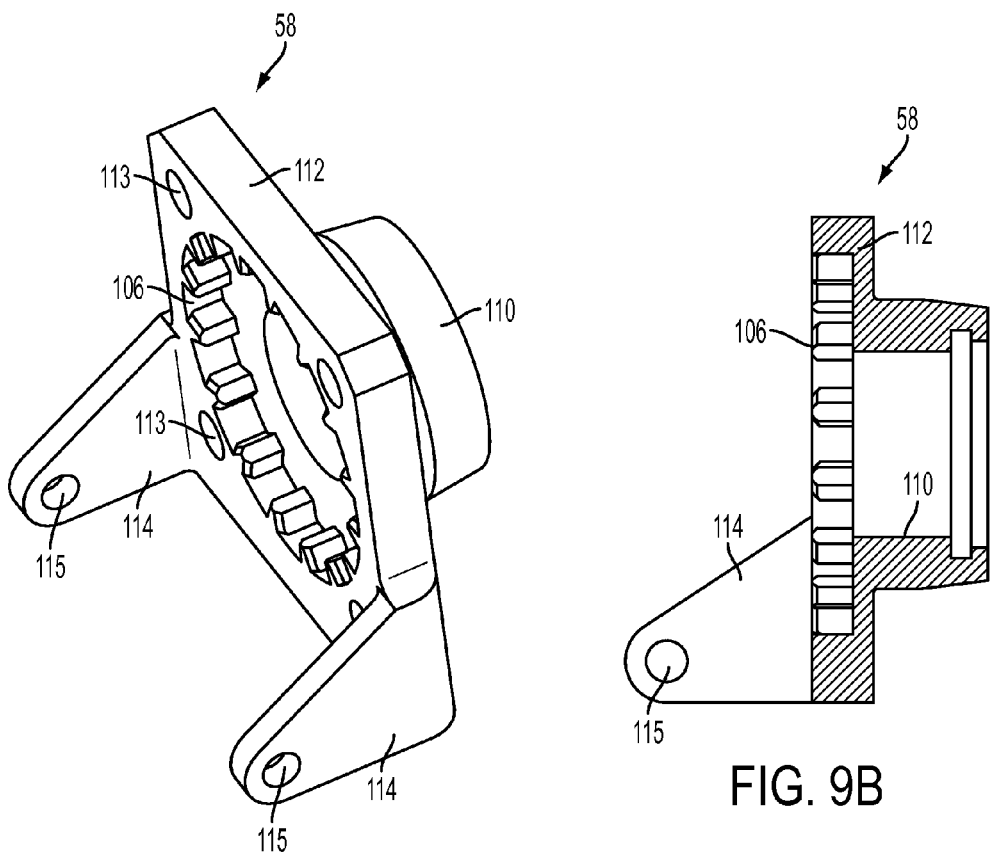
FIG. 9A
FIG. 9B

DUAL-SPEED AUTO-SHIFT LANDING GEAR

CROSS REFERENCE TO RELATED APPLICATION

The present application claims priority of U.S. provisional application Ser. No. 61/733,245, filed on Dec. 4, 2012, which is hereby incorporated herein by reference in its entirety.

BACKGROUND OF THE INVENTION

The present invention is directed to a semitrailer landing gear, and in particular a landing gear having a multi-speed gearing system that automatically shifts between high and low gear ranges.

Semitrailers include landing gear for supporting the forward portion of the semitrailer when disconnected from a truck, with the landing gear including legs that raise and lower the semitrailer when connecting or disconnecting to the fifth wheel of the truck. The landing gear legs are raised for road travel when the semitrailer is connected to a truck, in which case the legs are retracted without a load. Conversely, when disconnecting the semitrailer the landing gear legs are extended into contact with a support surface to raise the semitrailer such that they are extended while supporting a significant load. Landing gear include high and low gears for extension/retraction of the legs based on whether the legs are supporting a load or unloaded.

SUMMARY OF THE INVENTION

The present invention provides a multi-speed landing gear that automatically shifts between high speed and low speed settings.

According to an aspect of the present invention, a multi-speed landing gear for a trailer comprises a housing member and a telescoping leg member connected with the housing member, and a gear assembly arranged within the interior of the housing member and configured to operate in a high gear and a low gear setting. The gear assembly transmits motion for extending and retracting the leg member and automatically shifting from the high gear to the low gear when the leg member is lowered into contact with a support surface and automatically shifts from the low gear to the high gear when the leg member is raised out of contact with the support surface. In particular embodiments an engagement member engages the ring member to prevent rotation of the ring member.

The gear assembly includes a planetary gear assembly arranged to rotate transversely relative to the telescopic movement of the leg member, where the planetary gear assembly may comprise both a primary and a secondary gear assembly. An actuator selectively causes the planetary gear assembly to shift between the high and low speed settings, with actuation of the actuator occurring automatically without involvement by an operator. In particular embodiments an elevation screw that is acted on by the gear assembly to extend and retract the telescoping leg member is arranged to be displaced relative to the housing member to shift the planetary gear assembly between the high and low speed settings, with the relative movement of the elevation screw occurring when the telescoping leg is lowered or raised from a support surface. For example, axial movement of the elevation screw relative to the housing member may be used to cause movement of the actuator, with the actuator in turn causing an engagement member or shift member to move to prevent or allow rotation of a component of the planetary gear assembly. In a particular embodiment the engagement member is engaged with the ring member is axially moved to additionally engage a lock member to thereby prevent rotation of the ring member. Alternatively, the engagement member or actuator may be formed as, or with, or on the elevation screw, in which case the actuator may be displaced vertically upwards into engagement with the gear assembly when the leg member is lowered into contact with the support surface. In such an embodiment a clutch member may also selectively engage and disengage with the planetary gear assembly when automatically shifting between the high and low speed settings. Automatic shifting may further result from increases or decreases in torque required for raising/lowering the landing gear leg, such as via movement of the engagement member as a result of torque changes. For example, an engagement member formed as a clutch plate may be axially shifted into and out of engagement with the ring gear.

The planetary gear assembly includes one or more sun gears with associated planet gears operating within a ring gear, with rotation of the ring gear being prevented when operating in the low gear setting and direct rotation of the ring gear by an input shaft occurring in the high gear setting. In a particular embodiment planet gears are mounted on axles that are in turn mounted to an input drive gear whereby the input drive gear operates as a carrier. The input drive gear in turn engages with an output drive gear for driving the elevation member, where the input and output drive gears may comprise bevel gears. In a further embodiment in which the planetary gear assembly includes primary and secondary planetary gear assemblies sharing the ring gear, the carrier for the primary planet gears and the secondary sun gear are combined or connected to form a unitary construction.

The present invention provides a landing gear that automatically shifts between a high and low gear without input or adjustment by an operator, with the gear assembly being contained within the housing member of the landing gear. The landing gear operates in high gear when the landing gear is not supporting the weight of a semitrailer to which it is attached such that a leg portion may be rapidly extended and retracted. Upon the leg portion being extended into contact with a support surface such that the landing gear is loaded, the landing gear automatically shifts into low gear whereby an operator may extend and retract the leg portion with minimal input torque. The landing gear automatically shifts back to high gear once the leg portion is raised out of contact with the support surface.

These and other objects, advantages, purposes and features of this invention will become apparent upon review of the following specification in conjunction with the drawings.

BRIEF DESCRIPTION OF THE DRAWINGS

FIG. 7 is a perspective view of an actuator of the gear assembly of FIG. 3;

FIG. 8 is a perspective view of a biasing member used with the actuator of FIG. 7;

FIG. 9A is a perspective view of an actuator mount to which the actuator of FIG. 7 is joined;

FIG. 9B is a side cross sectional view of the actuator mount of FIG. 9A;

DESCRIPTION OF THE PREFERRED EMBODIMENTS

Figure 1:
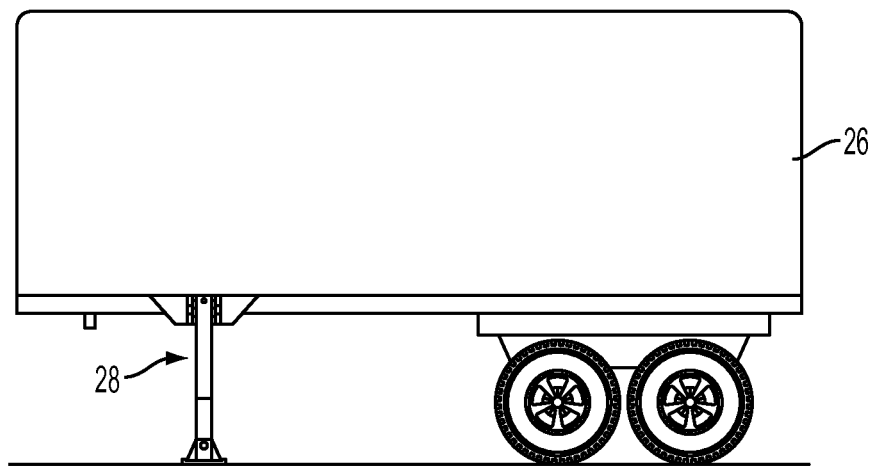
FIG. 1 is an illustration of a semitrailer incorporating the landing gear in accordance with the present invention.
Figure 2:
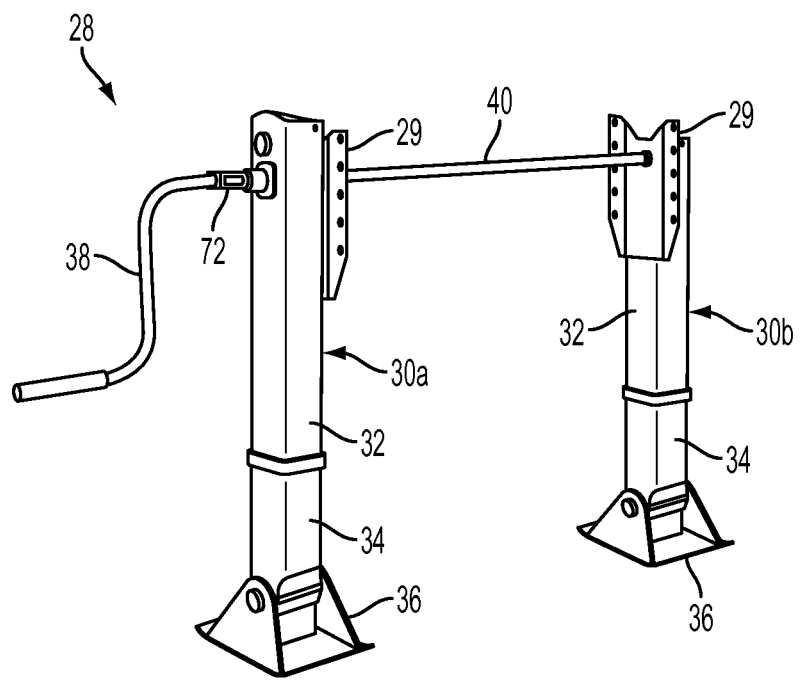
FIG. 2 is a perspective view of the pair of interconnected landing gear removed from the semitrailer of FIG. 1.

The present invention will now be described with reference to the accompanying figures, wherein the numbered elements in the following written description correspond to like-numbered elements in the figures. FIG. 1 discloses a semitrailer 26 supported by a forwardly located landing gear assembly 28, with FIG. 2 disclosing the assembly 28 removed from semitrailer 26. Assembly 28 includes a pair of landing gear 30a, 30b that are connected to trailer 26 by flanges 29, with each landing gear 30a, 30b including a housing 32 and a telescoping leg 34 having a pad or foot 36 for contacting a support surface. A manual crank 38 is joined to one of the landing gear 30a, with a transverse shaft or tube 40 extending from landing gear 30a to the other landing gear 30b. Rotation of crank 38 inputs rotational motion to landing gear 30a, as well as inputs rotational motion to landing gear 30b by way of the connection through transverse shaft 40. The provided torque input causes legs 34 to be simultaneously extended and retracted relative to housings 32 by way of internal gearing or gear assemblies within housings 32, with the legs 34 extending or retracting depending on the direction of rotation of crank 38.

Figure 3:
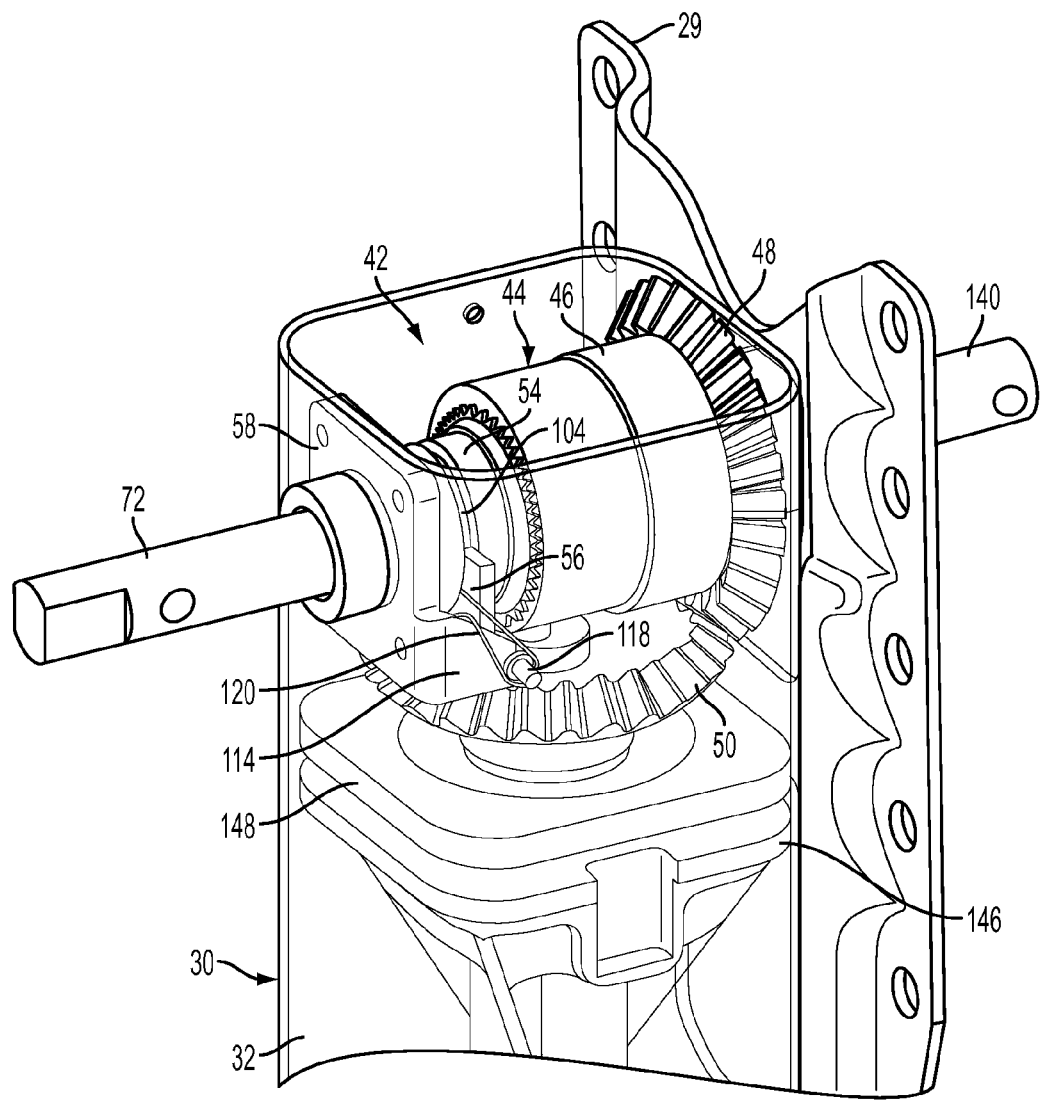
FIG. 3 is a partial upper perspective view of an embodiment of a landing gear in accordance with the present invention showing the gear assembly located within a portion of the landing gear housing.
Figure 4:
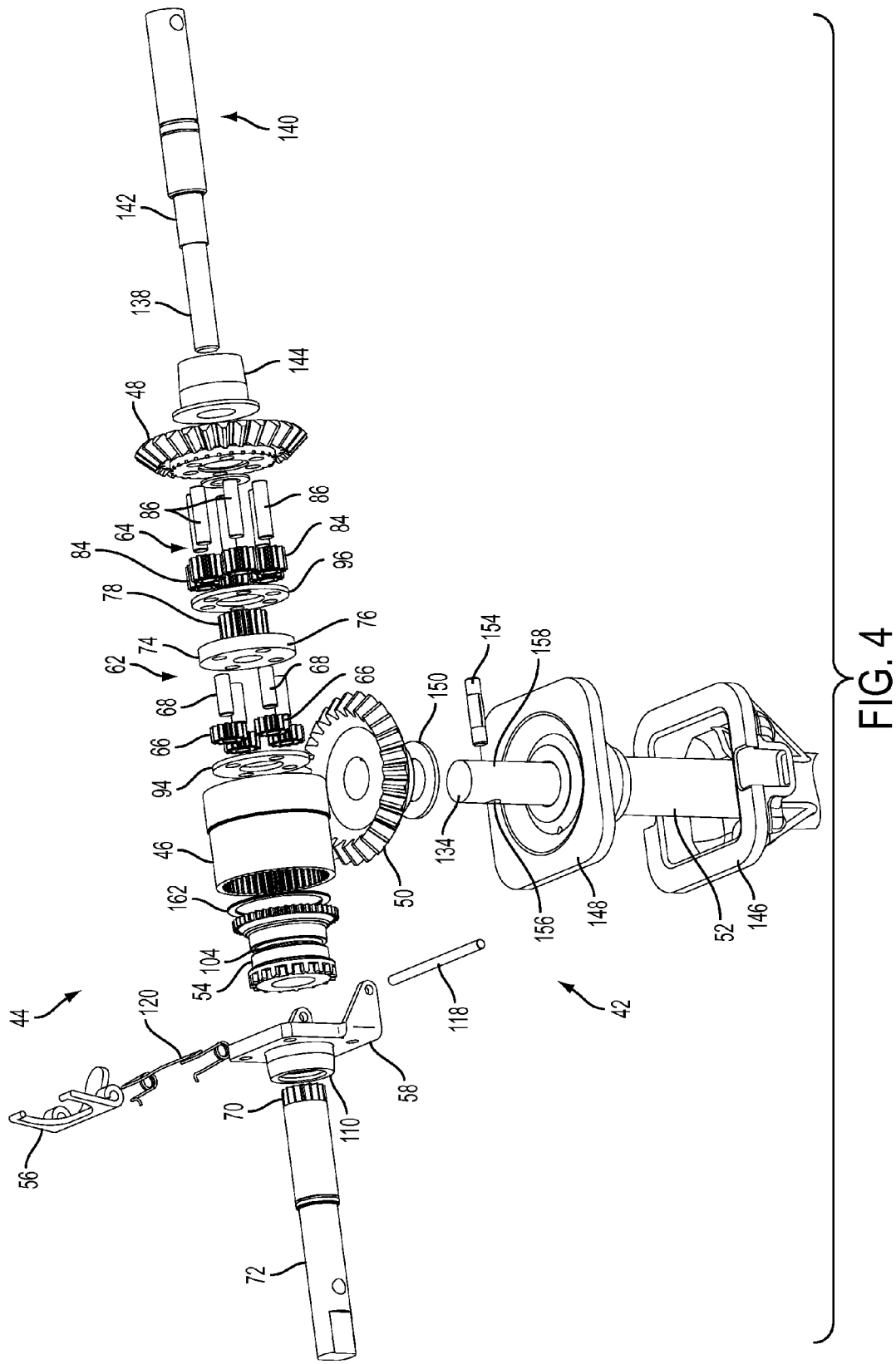
FIG. 4 is an exploded perspective view of the gear assembly of FIG. 3.

Referring now to FIG. 3, an upper end of a landing gear 30 in accordance with the present invention is disclosed that incorporates an automatically shifting gearbox or gear assembly 42, with gear assembly 42 being contained within housing 32. As discussed in detail below, gear assembly 42 provides both a high gear or high speed for rapidly extending and retracting leg 34 when there is no load on leg 34, as well as a low gear or low speed that is reduced from the input rotation provided by crank 38 for extending and retracting leg 34 when loaded. Moreover, gear assembly 42 automatically switches between high and low gears based on gear assembly 42 sensing or reacting to whether or not a load is applied to leg 34. That is, gear assembly 42 operates in a low gear when foot 36 is on a support surface and landing gear 30 is supporting weight of the semitrailer 26 and, conversely, gear assembly 42 operates in a high gear when foot 36 is not in contact with the support surface and landing gear 30 is not supporting the weight of the semitrailer 26, such as when the semitrailer 26 is joined to a fifth wheel of a truck and leg 34 is being retracted for road travel or when lowering the leg 34 prior to contact with the support surface when disconnecting semitrailer 26 from a truck. The shifting between high and low gears occurs automatically based on the state of the loading, without input from or adjustment by an operator of crank 38. Although a single landing gear 30 is shown in FIG. 3, a semitrailer may be equipped with a pair of landing gears 30 that incorporate gear assembly 42 and are joined by a transverse shaft 40 for simultaneous corresponding retraction and extension of legs 34 of assembly 28. Still further, a landing gear assembly may be formed wherein one landing gear includes gear assembly 42 that is connected to a slave landing gear by a transverse shaft 40, where the slave landing gear does not include a gear assembly 42, but instead includes, for example, a bevel gear arrangement for direct drive of the landing gear.

As understood from FIGS. 3, 4, 5A and 5B, gear assembly 42 comprises a planetary gear system or assembly 44 to achieve the necessary reduction in the low gear state, as well as an associated cylindrical ring gear 46 that is directly or concurrently driven when operating in the high gear state, with a set of drive gears comprising bevel gears 48, 50 being used to transmit torque to an elevation member configured as an elevation or jack screw 52 connected with landing gear let 34 to thereby extend and retract leg 34.

As discussed in more detail below, ring gear 46 is selectively actuated by way of an engagement member or shift member 54 that axially moves relative to ring gear 46 in connection with automatic shifting between high and low gears. When gear assembly 42 is in high gear, ring gear 46 concurrently rotates when an operator turns crank 38, whereby there is no reduction because bevel gears 48, 50 power elevation screw 52 by direct drive. (See FIG. 5A). Upon foot 36 of leg 34 contacting the support surface, gear assembly 42 automatically shifts into low gear by elevation screw 52 translating axially relative to the orientation of housing 32, with elevation screw 52 driving an actuator member 56 to move shift member 54 into engagement with actuator mount 58 to thereby prevent rotation of shift member 54. When so moved, shift member 54 remains engaged with ring gear 46 such that ring gear 46 is also prevented from rotating. As discussed below, rotation of crank 38 then causes components of gear assembly 42 to operate within the interior 60 of ring gear 46 to provide the gear reduction needed under loaded conditions. (See FIG. 5B).

Figure 11A:
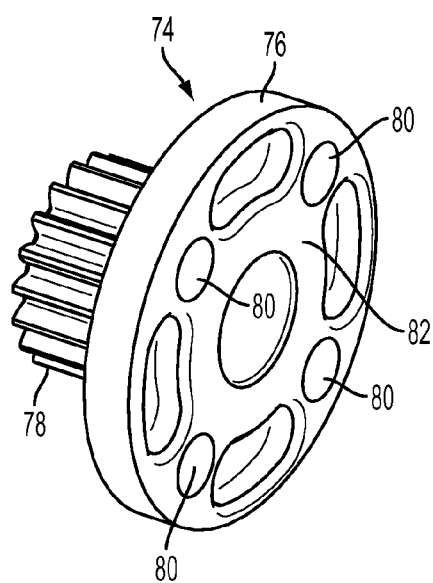
FIGS. 11A and 11B are opposite end perspective views of a combined primary carrier/secondary sun gear of the gear assembly of FIG. 3.
Figure 11B:
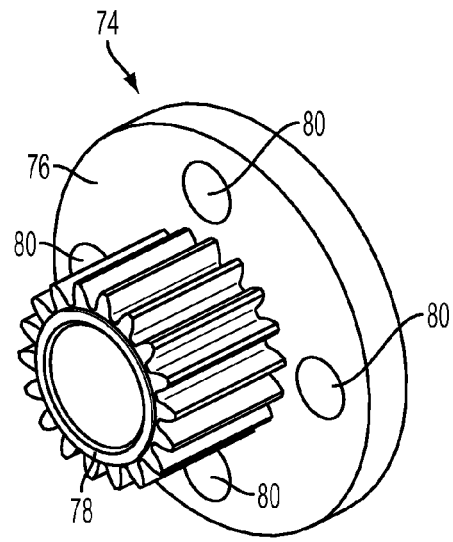
Figure 12:
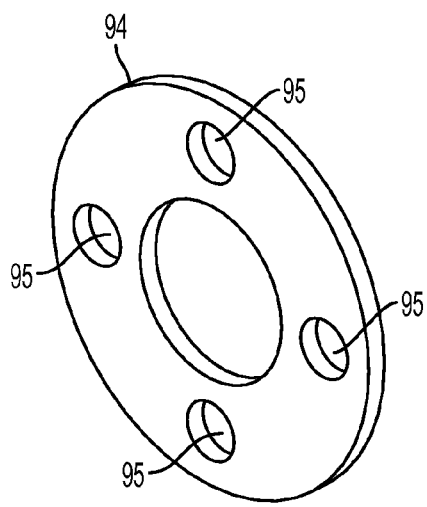
FIGS. 12 and 13 are perspective views of support rings for the planetary gear assemblies of the gear assembly of FIG. 3.
Figure 13:
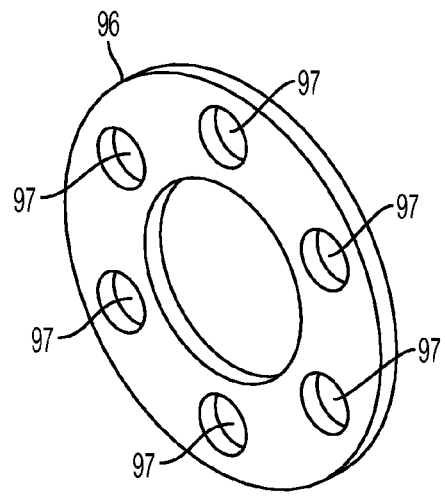
Figure 14:
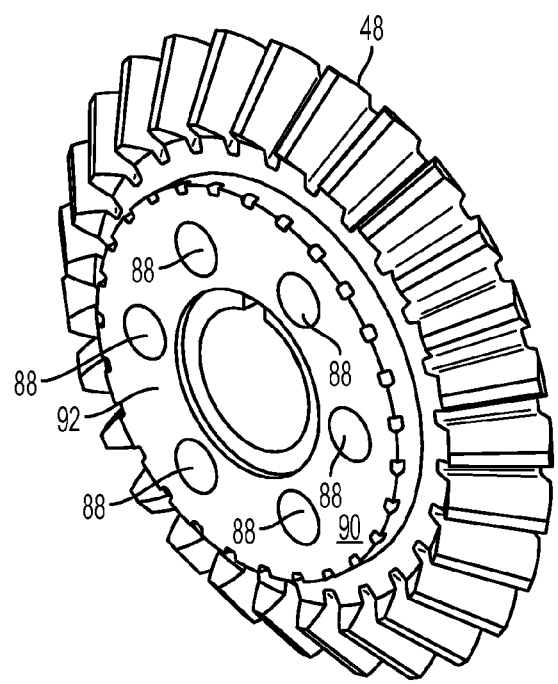
FIG. 14 is a front end perspective view of a combined input bevel gear/secondary carrier shown in FIG. 3.
Figure 15:
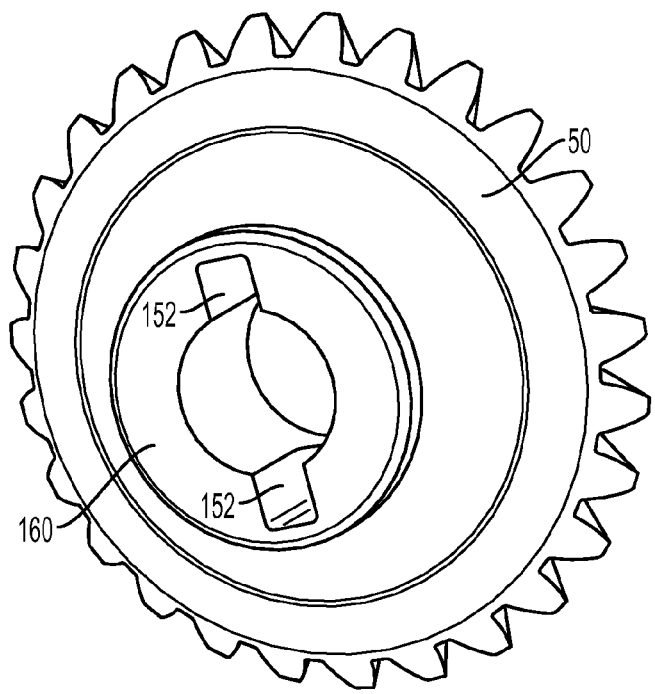
FIG. 15 is a rear perspective view of an output bevel gear shown in FIG. 3.
Figure 16:
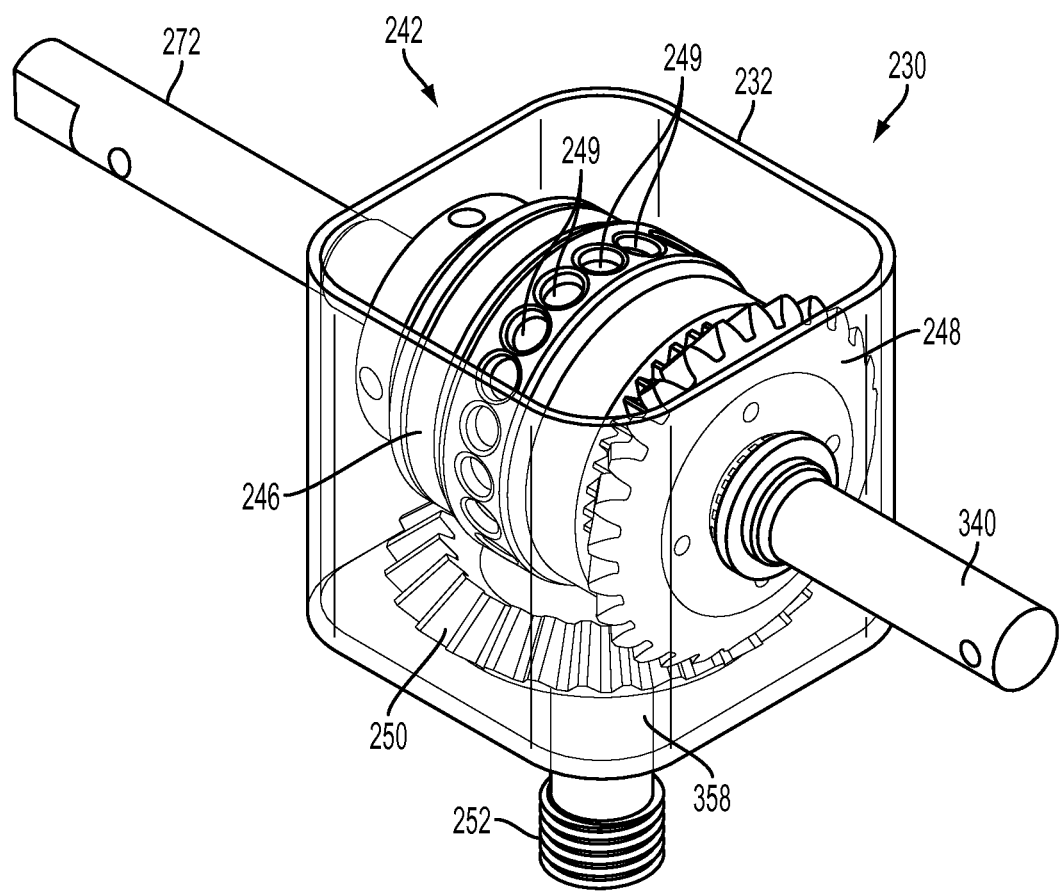
FIG. 16 is a partial perspective view of another embodiment for a landing gear in accordance with the present invention.
Figure 17:
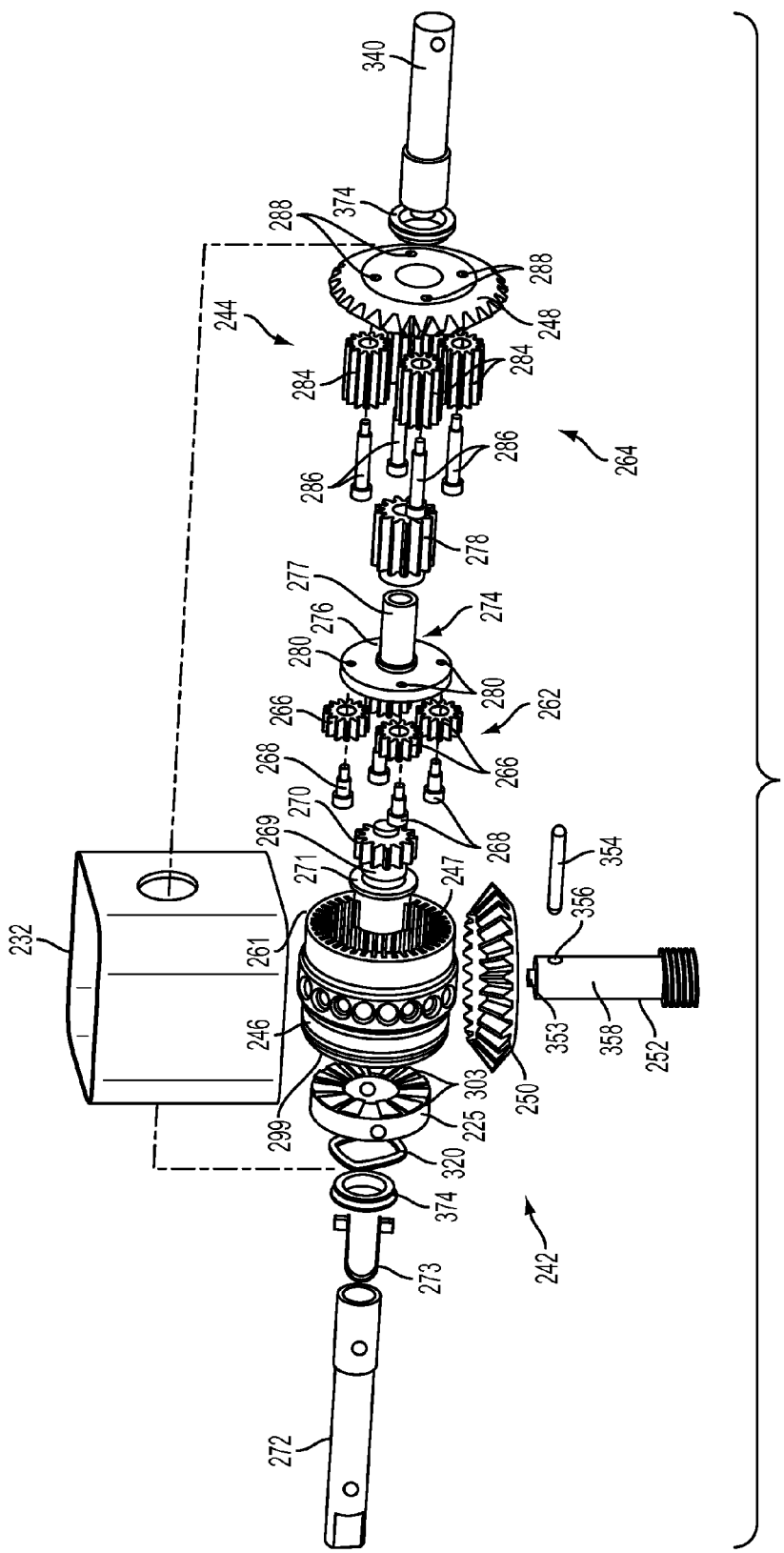
FIG. 17 is an exploded perspective view of the landing gear of FIG. 16.
Figure 18A:
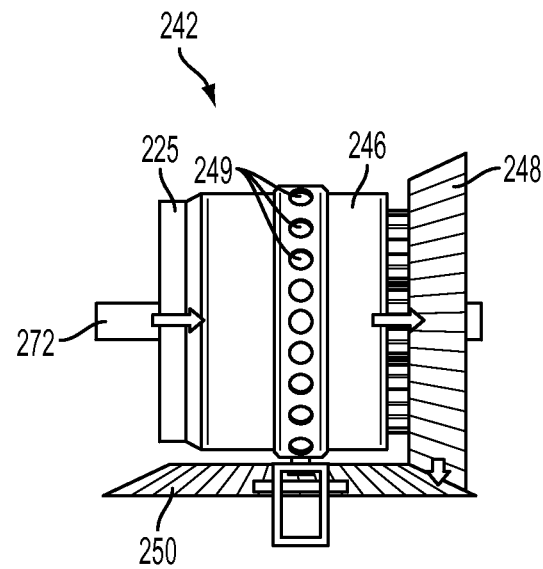
FIG. 18A is a schematic illustration of the landing gear of FIG. 16 operating in a high gear setting.
Figure 18B:
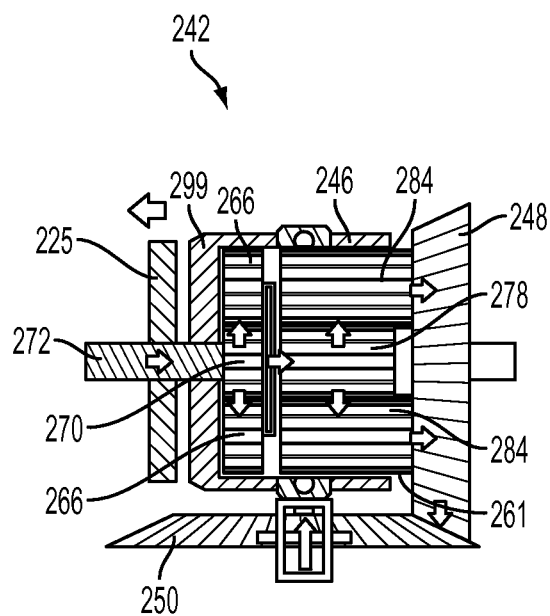
FIG. 18B is a schematic illustration of the landing gear of FIG. 16 operating in a low gear setting.

In the embodiment of FIGS. 3-15, the planetary gear assembly 44 of gear assembly 42 includes both a primary planetary gear assembly 62 and a secondary planetary gear assembly 64 that are interconnected via the sharing of a gear member 74 and are assembled within ring gear 46. Primary planetary gear assembly includes multiple primary planet gears 66 that are each mounted for rotation on separate axles 68 and mesh with a primary sun gear 70 formed on the end of the input shaft 72, where crank 38 is selectively attached to the opposite end of input shaft 72 for imparting driving rotation to gear assembly 42. In the embodiment shown four primary planet gears 66 are utilized, but alternative numbers could be utilized. Axles 68 are mounted at one end to gear member 74 (FIGS. 11A and 11B) that comprises a combined primary carrier 76 and secondary sun gear 78, with axles 68 being mounted within holes 80 of primary carrier 76 to extend outwardly from face 82 of carrier 76. As discussed in more detail below, the opposite ends of axles 68 extend beyond primary planet gears 66 whereby the axles are selectively engaged by shift member 54.

Primary carrier 76 and secondary sun gear 78 of gear member 74 rotate together, with gear member 74 thus forming part of both the primary and secondary planetary gear assemblies. Secondary planetary gear assembly further includes multiple secondary planet gears 84 that are each mounted for rotation on separate axles 86 and mesh with secondary sun gear 78. Axles 86 are mounted within holes 88 on face 90 of input drive bevel gear 48 (FIG. 14), whereby input bevel gear 48 comprises a secondary carrier 92 of the secondary planetary gear assembly. In the embodiment shown six secondary planet gears 66 are utilized, but alternative numbers could be utilized.

A pair of support rings 94, 96 are additionally provided that receive the axles 68 and 86. Support ring 94 (FIG. 12) includes multiple holes 95 for receiving the axles 68 of the primary planetary gear assembly 62 on the opposite side of primary planet gears 66 relative to primary carrier 76. Similarly, support ring 96 (FIG. 13) includes multiple holes 97 for receiving the axles 86 of the secondary planetary gear assembly 64 on the opposite side of secondary planet gears 84 relative to secondary carrier 92 of input bevel 48. Rings 94, 96 operate to provide rigidity to the assembly of the primary and secondary planetary gear assemblies, respectively.

Figure 6A:
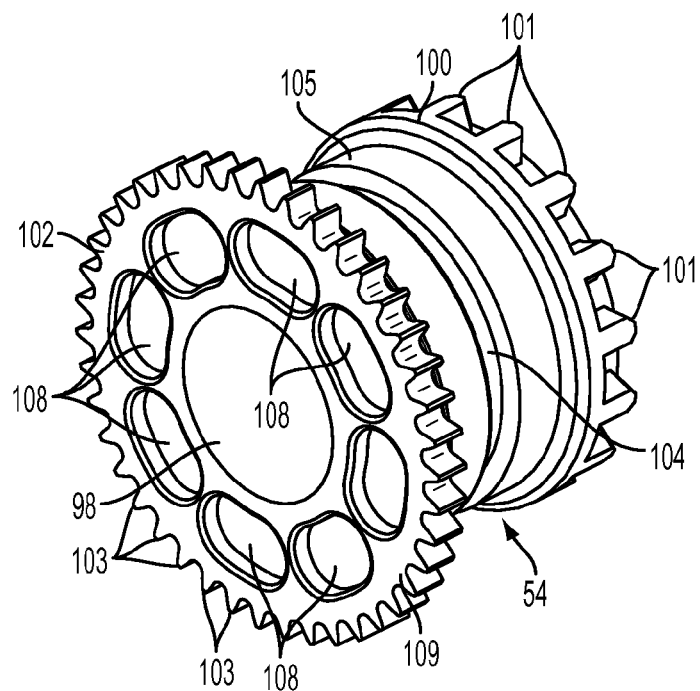
FIGS. 6A and 6B are opposite end perspective views of a shift member of the gear assembly of FIG. 3.
Figure 6B:
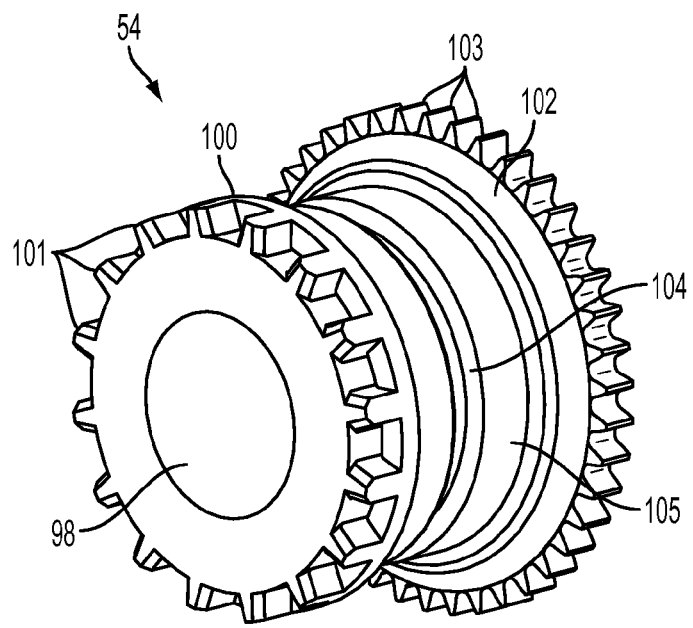
Figure 10A:
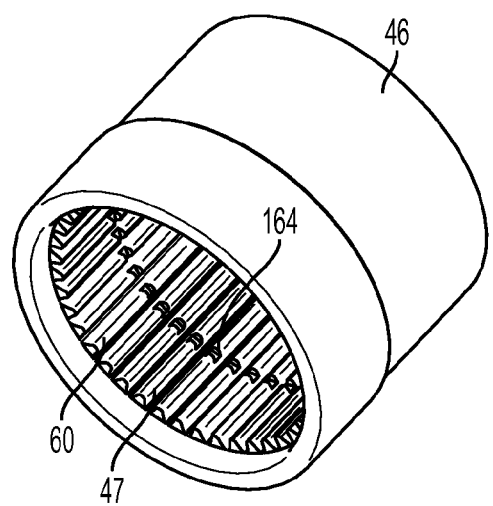
FIG. 10A is a perspective view of a ring gear of the gear assembly of FIG. 3.
Figure 10B:
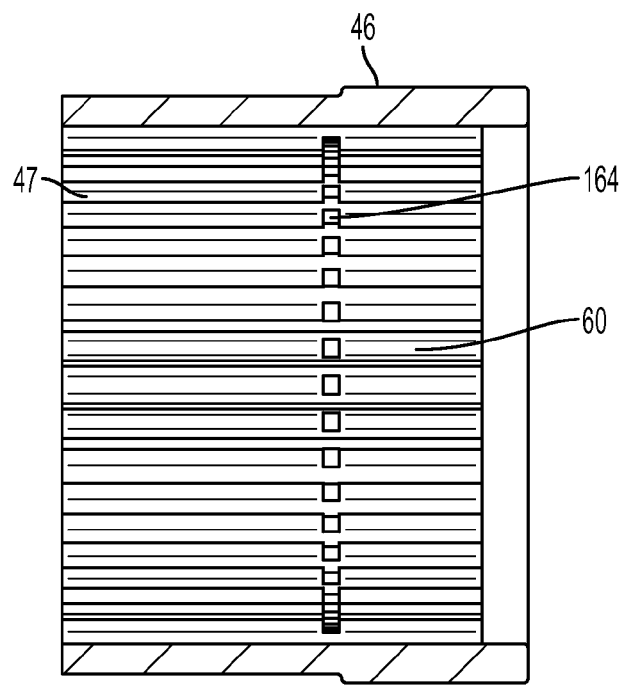
FIG. 10B is a side cross sectional view of the ring gear of FIG. 10A.

As noted, gear assembly 42 further includes shift member 54, where shift member 54 comprises and operates as a shift dog or dog clutch. With reference to FIGS. 6A and 6B, shift member 54 is shown to include a central through hole 98 whereby it is slidingly mounted to input shaft 72. Shift member 54 further includes a first geared end 100, a second geared end 102 and a circumferential groove 104 located between geared ends 100 and 102, where groove 104 is formed in a central location 105 of shift member 54 that has a smaller diameter than either of geared ends 100, 102. In the embodiment shown, as discussed in more detail below, geared end 100 includes teeth 101 and geared end 102 includes teeth 103, with teeth 103 of geared end 102 engaging internal circumferentially disposed gear teeth 47 (FIGS. 10A and 10B) located within the interior 60 of ring gear 46. As thus understood, ring gear 46 comprises an internal gear. Still further, teeth 101 of geared end 100 selectively engage with a lock member or receptacle formed as a mating gear 106 (FIGS. 9A and 9B) that in the illustrated embodiment is formed as part of actuator mount 58, where mating gear 106 comprises a spline gear. It should be appreciated that the lock member need not be constructed as a mating spline gear 106 in order to operate and that alternative shapes, structures and configurations on shift member 54 and lock member may be employed for preventing rotation of shift member 54. Shift member 54 further includes multiple elongate apertures 108 located on face 109 of first geared end 102 where apertures 108, as also described in more detail below, selectively receive ends of axles 68 extending beyond primary planet gears 66 mounted thereon.

Referring now to FIGS. 7-9B, in addition to mating gear 106, actuator mount 58 includes an input bearing 110 for receiving input shaft 72, and a mounting plate 112 with holes 113 for affixing mount 58 to the interior of housing 32. Actuator mount 58 further includes a pair of extending tabs or flanges 114 with holes 115 with actuator 56 being joined to actuator mount 58 between flanges 114. In particular, actuator 56 includes mounting holes 116 where a pivot pin or shaft 118 (FIG. 4) is positioned within holes 115 on flanges 114 and mounting holes 116 of actuator 56 when actuator 56 is positioned between flanges 114 to retain actuator 56 to actuator mount 58. A biasing member constructed as a torsion spring 120 (FIG. 8) is joined to actuator mount 58, with spring 120 including arms 122, coiled openings 124 and members 126. Coiled openings 124 are disposed over ends of pin 118 with arms 122 engaging flanges 114 whereby members 126 of spring 120 press against portions of actuator 56 as discussed below to provide a downwardly pivoting biasing force to actuator 56.

With specific reference to FIG. 7, actuator 56 further includes a pair of arms 128 with inwardly disposed projections 130, where arms 128 define an opening 131 there between for receiving shift member 54 when assembled. Actuator further includes an additional outwardly projecting tab or arm 132 where arms 128 form an approximately 110 degree angle relative to tab 132 in the illustrated embodiment.

When gear assembly 42 is assembled, arms 128 of actuator 56 are disposed about central portion 105 of shift member 54, with projections 130 being disposed within groove 104. Spring 120 is assembled to actuator mount 58 such that members 126 are disposed between plate 112 and arms 128 whereby members 126 act on arms 128 to pivot actuator 56 about shaft 118 such that tab 132 is downwardly biased. Spring 120 thus correspondingly biases shift member 54 to be disengaged from mating gear 106 via projections 130 acting on shift member 54 in groove 104. As understood from FIGS. 5A and 5B, geared end 102 of shift member 54 is disposed within ring gear 46 such that spring 120 biases shift member 54 into ring gear 46. When so biased, shift member 54 engages the axles 68 of the primary planet gears 66, with the ends of the axles 68 being received within the apertures 108 of shift member 54 in the high gear position.

Referring again to FIGS. 4-5B, input shaft 72 includes a cavity 136 into which an end 138 of output shaft 140 is inserted. Shift member 54 is slidably disposed over input shaft 72 and gear member 74 is disposed over a recessed portion 142 of output shaft 140, where portion 142 has a larger diameter than that of end 138. Still further, input bevel 48 is mounted to the largest diameter portion of output shaft 140 with input bevel 48 including a key groove for mating with a key on shaft 140 whereby input bevel 48 rotates with shaft 140. When assembled, output shaft 140 is further supported within an additional bearing 144 affixed to housing 32 whereby transverse shaft 40 may then be affixed to the portion of output shaft 140 extending from housing 32. It should be appreciated that landing gear 30 of FIGS. 3-5B depicts landing gear 30a of the assembly 28 of FIGS. 1 and 2, as well as that landing gear 30b is substantially similar to landing gear 30 of FIGS. 3-5B, but that the output shaft 140 would not extend out of housing 32.

As further understood from FIGS. 3-5B, landing gear 30 includes a lift nut 146 that is fixedly mounted to leg 34 with elevation screw 52 rotating within lift nut 146 to extend and retract leg 34. Also included is a floor base 148 that is fixedly mounted within housing 32, with a thrust washer 150 being positioned between floor base 148 and output drive bevel gear 50 when assembled. Output bevel gear 50 includes a cavity or slot 152 within which a drive pin 154 is located, where drive pin 154 is passed through a hole 156 in shaft 158 of elevation screw 52 with drive pin 154 operating to transmit rotational torque from output bevel gear 50 to elevation screw 52. As discussed below, cavity 152 is sufficiently deep relative to the bottom surface 160 to enable shaft 158 to move transversely relative to output bevel gear 50 between a first position illustrated in FIG. 5A associated with high speed operation and a second position illustrated in FIG. 5B associated with low speed operation.

As previously noted, when gear assembly 42 is assembled primary and secondary planetary gear assemblies are positioned within the interior 60 of ring gear 46. In addition, a retaining ring 162 is positioned between the primary planet gears 66 and secondary planet gears 84. Ring gear 46 includes an internal groove 164 (FIGS. 10A and 10B) formed in teeth 47 with retaining ring 162 being positioned within groove 164. In the illustrated embodiment retaining ring 46 comprises a conventional internal spiral retaining ring.

Figure 5A:
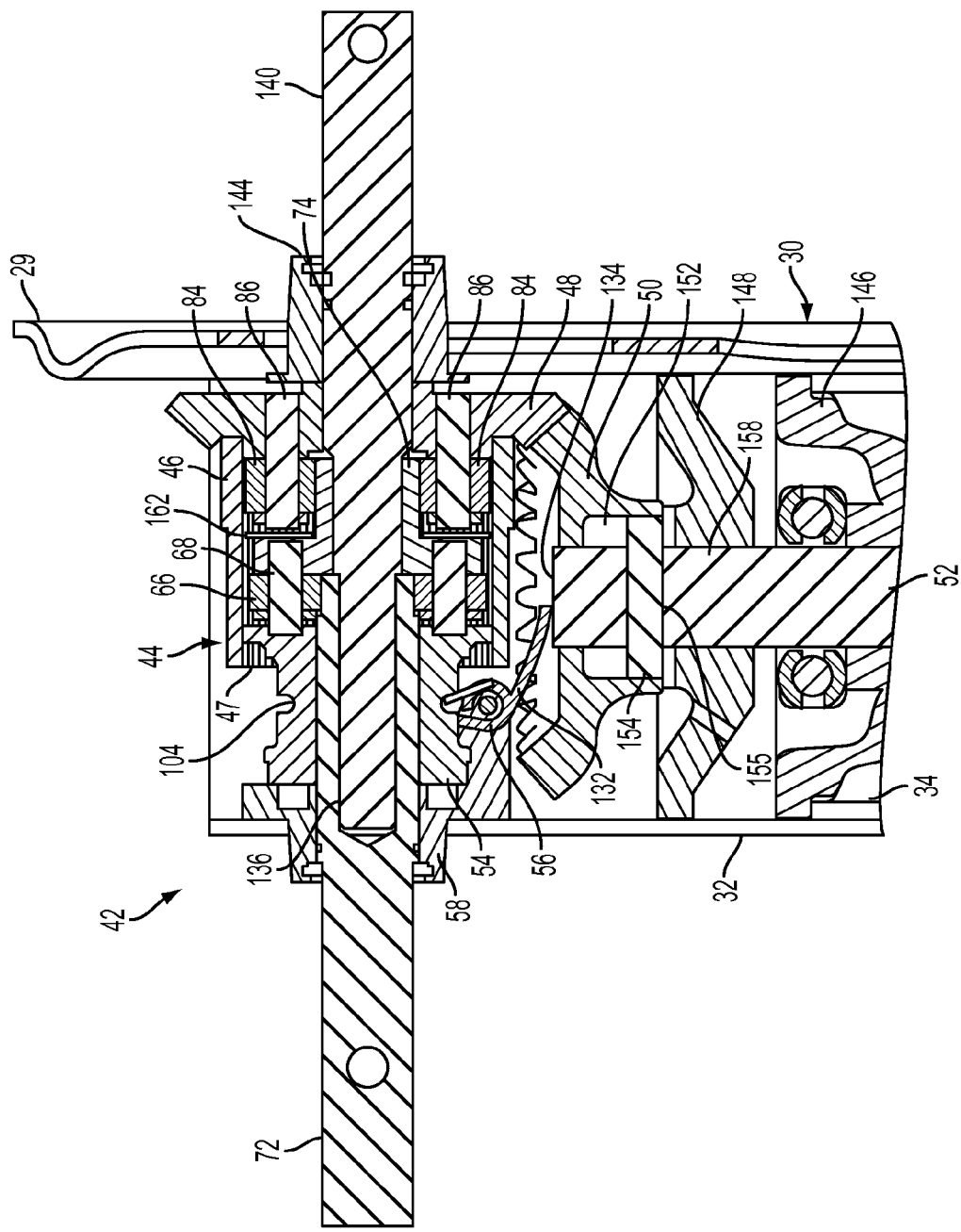
FIG. 5A is a side cross sectional view of the landing gear of FIG. 3 operating in a high gear setting.

The operation of landing gear 30, including the automatic shifting, will now be discussed with principal reference to FIGS. 5A and 5B. In the high gear orientation of FIG. 5A, shift member 54 is in a first position biased out of engagement with mating gear 106 of actuator mount 58 by spring 120 and teeth 103 of geared end 102 of shift member 54 are engaged with internal teeth 47 of ring gear 46. Shift member 54 is additionally biased into engagement with axles 68 of primary planetary gears 66, with the axles 68 being received within elongated apertures 108. Of note the elongated construction of apertures 108 aids in receiving axles 68 therein when shift member 54 is moved into engagement with axles 68. Primary sun gear 70 on input shaft 72 is engaged with primary planet gears 66 such that, with axles 68 engaged with shift member 54, as well as because axles 68 are mounted to gear member 74, rotation of input shaft 72 causes direct drive rotation of the planetary gear assembly to input bevel gear 48. That is ring gear 46 rotates as does gear member 74 without relative rotation of planetary gears 66, 84 such that input bevel gear 48 rotates on a one-to-one rotational basis with input shaft 72 by way of the mounting of secondary planet gears 84 to secondary carrier 92 of input shaft 72 to thereby raise and lower leg 34 when not under load. In the illustrated embodiment input bevel gear 48 and output bevel gear 50 are approximately the same size such that the ratio of rotation of input shaft 72 to elevation screw 52 is one-to-one or approximately one-to-one. Alternatively, however, output bevel gear 50 and input bevel gear 48 may be alternatively sized relative to each other to obtain alternative high gear ratios. For example, output bevel gear 50 may be sized to be smaller than input bevel gear 48 whereby the ratio of input shaft 72 revolutions in high speed to output bevel gear 50 revolutions is less than one, including, for example, in the range of four to one.

Figure 5B:
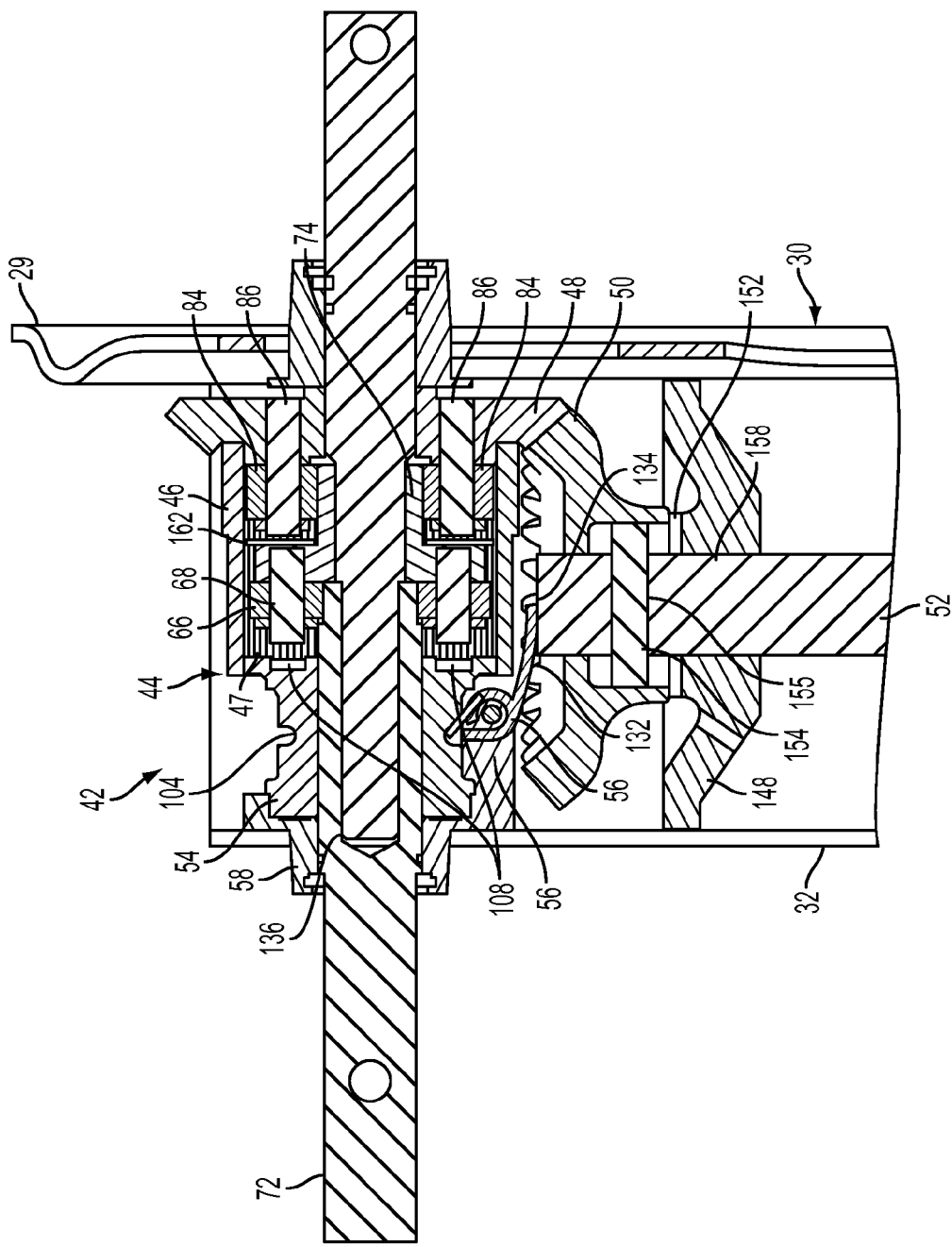
FIG. 5B is a side cross sectional view of the landing gear of FIG. 3 operating in a low gear setting.

As understood from FIG. 5B, upon pad 36 of leg 34 contacting a support surface, elevation screw 52 axially translates upward relative to output bevel 50, with upper portion 134 of shaft 158 acting on tab 132 to pivot actuator 56 upwards against the force of spring 120. The upward axial movement is caused by continued rotation of elevation screw 52 when pad 36 contacts the support surface and is enabled by way of the cavity 152 in output bevel gear 50. Shift member 54 is thereby moved into a second position by actuator 56, with arms 128 axially shifting or moving shift member 54 by way of projections 130 disposed within groove 104 to simultaneously disengage shift member 54 from axles 68 such that axles 68 are no longer contained within apertures 108, as well as to engage teeth 101 of geared end 100 of shift member 54 into engagement with mating gear 106 of actuator mount 58. Teeth 103 of geared end 100, however, remain engaged with teeth 47 of ring gear 46. As understood from FIG. 5B, the axial shifting or movement of shift member 54 when switching between high gear and low gear is transverse to the telescopic movement of leg 34. The engagement of shift member 54 with mating gear 106 prevents shift member 54 from rotating, which in turn also locks and prevents ring gear 46 from rotating. Thus, rotation of input shaft 72 causes rotation of the planetary gear assembly 44 within ring gear 46. That is, primary planet gears 66 are caused to rotate within the interior 60 of ring gear 46, which in turn causes gear member 74 to rotate due to the engagement of axles 68 with primary carrier 76, with secondary sun gear 78 in turn imparting rotation to secondary planet gears 84 within ring gear 46 and thereby rotating input bevel gear 48 by way of their connection via secondary carrier 92 on input bevel gear 48. Accordingly, in low gear or low speed, as shown in FIG. 5B, a reduction occurs between rotation of input shaft 72 and input bevel gear 48. In the illustrated embodiment, secondary sun gear 78 is larger than the primary sun gear 70, and the primary planet gears 66 are larger than the secondary planet gears 84. It should be appreciated, however, that these size differences could be reversed, or the gears of the primary and secondary planetary gear assemblies could be the same. The provision of both primary and secondary planetary gear assemblies 62, 64 enables desired gear ratios to be provided in the low gear setting. A planetary gear assembly in accordance with the present invention may be constructed to have, for example, a ratio of between 20 to 1 to 40 to 1.

Actuator member 56, shift member 54 and actuator mount 58 thus operate as an actuator assembly to achieve automatic shifting between high and low gear. As disclosed, automatic shifting occurs without any additional action from an operator of landing gear 30 with the input shaft 72 not requiring to be moved, such as in an axial direction or otherwise, to accomplish shifting. Although disclosed as utilizing a mechanical actuation for automatic shifting, automatic shifting of the gear assembly 42 may alternatively be accomplished by way of a solenoid or linear motor, such as to axially move shift member 54. Still further, automatic shifting between high and low speeds may alternatively be accomplished by way of either an increase or decrease in the input or output torque involved in extending and retracting leg 34. For example, input shaft 72 may be connected with gear assembly 42 in similar manner to the construction of a torque wrench whereby upon reaching a particular increase in input torque required to extend leg 34, such as when pad 36 contacts the support surface, automatic shifting to low gear occurs by way of shifting shift member 54.

Referring now to FIGS. 16-23B an alternative landing gear 230 in accordance with the present invention is illustrated that is similar in construction and operation to landing gear 30 discussed above. Like components of landing gear 230 relative to landing gear 30 are labeled with similar reference numerals, but with 200 added to the reference numerals of landing gear 230. Due to their similarities and the above description, not all of the construction and operation of landing gear 230 need be discussed herein.

As understood from FIGS. 16, 17, 18A and 18B, landing gear 230 includes a gear assembly 242 that comprises a planetary gear system or assembly 244 to achieve the necessary reduction in the low gear state, with planetary gear system 244 including a cylindrical gear or detent ring gear 246 that is concurrently or directly driven when operating in the high gear state, and a set of bevel gears 248, 250 to transmit torque to an elevation member configured as an elevation screw or jack screw 252 connected with the telescoping landing gear lower leg to thereby extend and retract the leg.

Ring gear 246 is actuated by a clutch plate 225 in connection with automatic shifting. When gear assembly 242 is in high gear, clutch plate 225 engages ring gear 246 causing ring gear 246 to concurrently rotate when an operator turns a crank, whereby there is no reduction because the bevel gears 248, 250 power jack screw 252 by direct drive. (See FIG. 18A). Upon the foot of the lower leg contacting the support surface, gear assembly 242 automatically shifts into low gear by jack screw 252 translating axially and engaging one of the receptacles or detents 249 that are disposed about the circumferential exterior of ring gear 246. Jack screw 252 thereby operates as an actuator of gear assembly 242. Upon jack screw 252 engaging a detent 249 rotation of ring gear 246 is stopped and clutch plate 225 disengages from ring gear 246. As discussed in detail below, components of the planetary gear system 244 then operate within the interior 260 of the stationary ring gear 246 to provide the gear reduction needed under loaded conditions. (See FIG. 18B).

Figure 19:
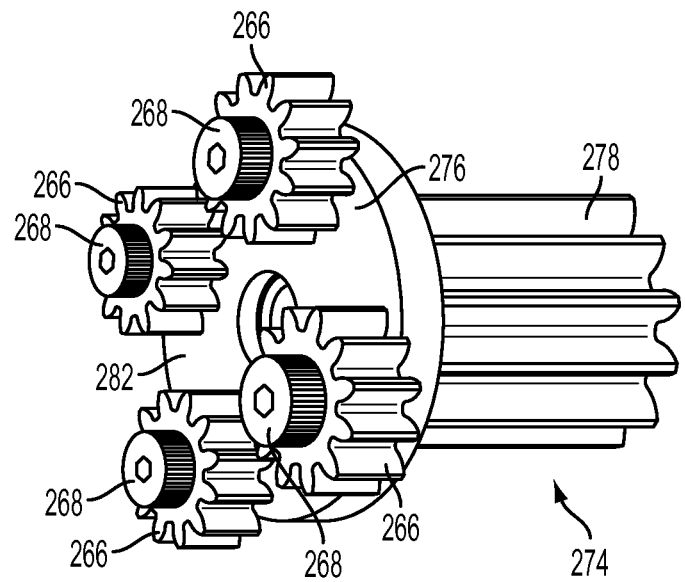
FIG. 19 is a perspective view of the primary planet gear assembly of FIG. 16 disclosing the primary planet gears mounted to the primary carrier.
Figure 20:
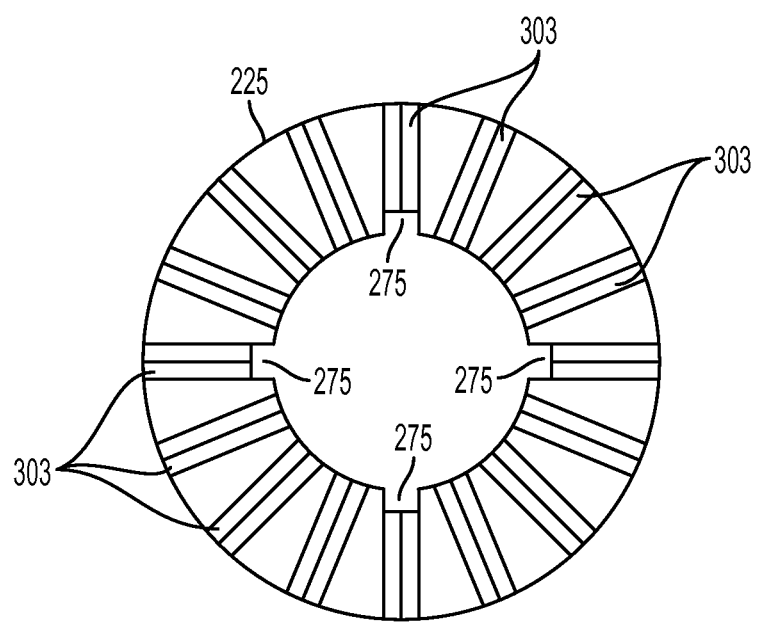
FIG. 20 is a front elevation view of a clutch member of the gear assembly of FIG. 16.
Figure 21A:
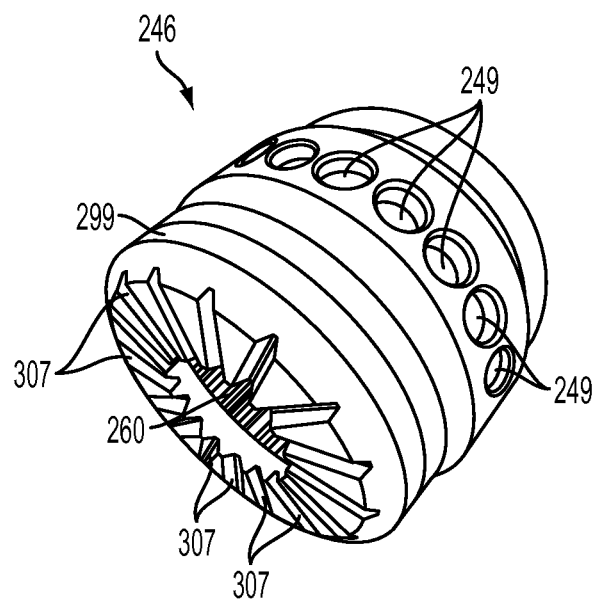
FIG. 21A is a perspective view of a cylindrical ring gear of the gear assembly of FIG. 16.
Figure 21B:
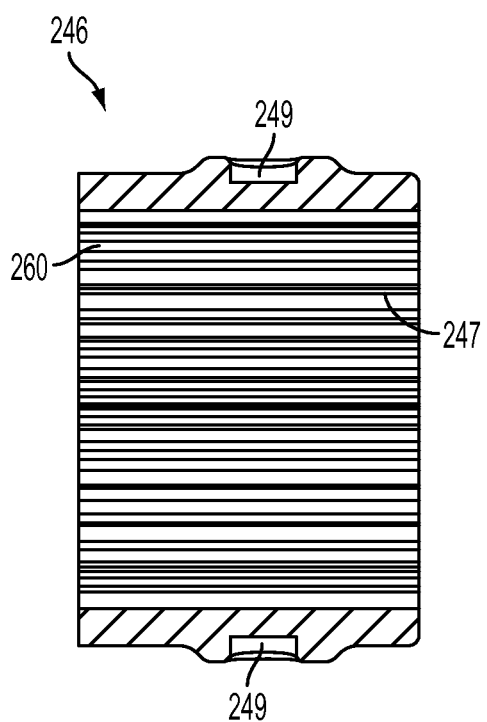
FIG. 21B is a side elevation cross sectional view of the ring gear of FIG. 21A shown without the front plate.
Figure 22:
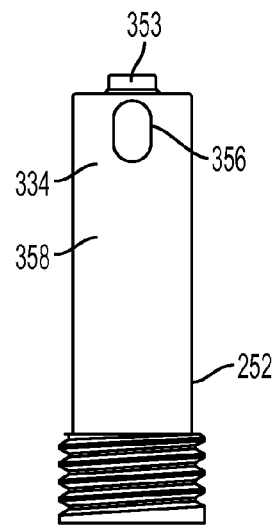
FIG. 22 is a partial side elevation view of a jack screw of the landing gear of FIG. 17.

In the illustrated embodiment, planetary gear system 244 includes both a primary planetary gear assembly 262 and a secondary planetary gear assembly 264. The primary planetary gear assembly includes multiple primary planet gears 266, four in the embodiment shown, and a primary carrier 276 having a shaft 277, with primary planet gears 266 being mounted to a rear face 282 of carrier 276 by four separate shoulder screws 268 that are received in holes 280 (FIG. 17) as illustrated in FIG. 19. The primary planet gears 266 are thus able to rotate on the screws 268. In addition, secondary sun gear 278 is rigidly fixed to shaft 277 of primary carrier 276, such that the primary carrier 276 and secondary sun gear 278 rotate together. The combined primary carrier 276 and secondary sun gear 278 thus form gear member 274. The secondary sun gear 278 in turn, which comprises part of secondary planetary gear assembly 264, is able to rotate multiple secondary planet gears 284, four in the embodiment shown, of gear assembly 264 when operating in the low gear state. The secondary planet gears 284 are each joined to the front face of input bevel gear 248 by separate shoulder screws 286 that are received in holes 288 (FIG. 17), whereby input bevel gear 248 also operates as a secondary carrier of secondary planetary gear assembly 264. In like manner to primary planet gears 266, the secondary planet gears 284 are able to rotate on screws 286. The primary planet gears 266, primary carrier 276, secondary sun gear 278, and secondary planet gears 284 of planetary gear system 244 are all housed within interior 260 of ring gear 246, with secondary planet gears 284 extending out of or beyond the opening 261 of ring gear 246 where secondary planet gears 284 are mounted to input bevel 248. (See FIGS. 18A and 18B). Secondary planet gears 284 could alternatively be flush with opening 261 of ring gear 246. Ring gear 246 includes internal circumferentially disposed teeth 247 (FIGS. 17 and 21B) within interior 260 that engage with the teeth of primary planet gears 266 and secondary planet gears 284 when assembled together. Accordingly, as shown in the embodiment of FIGS. 16-18B, primary planetary gear assembly 262 and secondary planetary gear assembly 264 share ring gear 246.

A crank, such as crank 38 above, connects to input shaft 272 to transmit torque from the turning of the crank when in operation, with input shaft 272 being connected to an input collar 271 by a spring clip 273. To turn primary planet gears 266 and primary carrier 276 in low gear, a primary sun gear 270 is rigidly fixed into the input collar 271, with primary sun gear 270 including a shaft portion 269 (FIG. 17) that is fixed into a bore of input collar 271. Torque is in turn transmitted to clutch plate 225 by input collar 271 via a keyed connection between clutch plate 225 and collar 271, with collar 271 including keys that align with key grooves 275 (FIG. 20) of clutch plate 225.

In the high-gear setting, teeth 303 (FIG. 20) on clutch plate 225 mate with grooves 307 on a front portion or plate or face 299 that is joined to ring gear 246 (FIGS. 18B and 21A) such that ring gear 246 and the components of planetary gear system 244 within interior 260 of ring gear 246 rotate together as one unit, thereby providing direct-drive to the input bevel gear 248 via connection of shoulder screws 286 of secondary planet gears 284 thereto. In turn, input bevel gear 248 provides rotational motion to output bevel gear 250, with input bevel gear 248 being keyed to an output shaft 340 to engage an opposite landing gear via a transverse shaft 40 to which output shaft 340 is connected. As output bevel gear 250 is turned by input bevel gear 248, it turns jack screw 252 to extend and retract the lower telescoping leg of landing gear 230, such as a leg 34 as above.

Figure 23A:
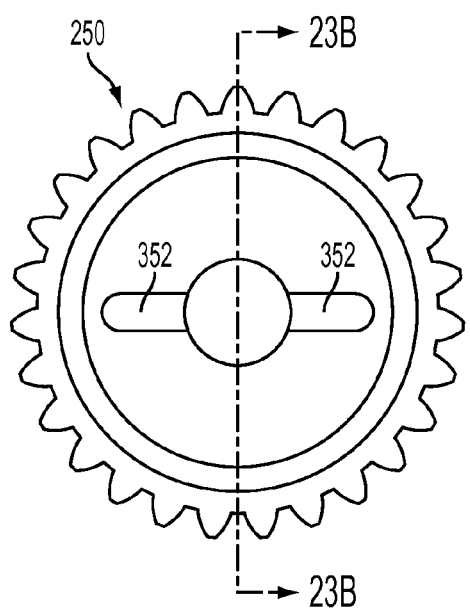
FIG. 23A is a bottom elevation view of the output bevel gear of the gear assembly of FIG. 16.
Figure 23B:
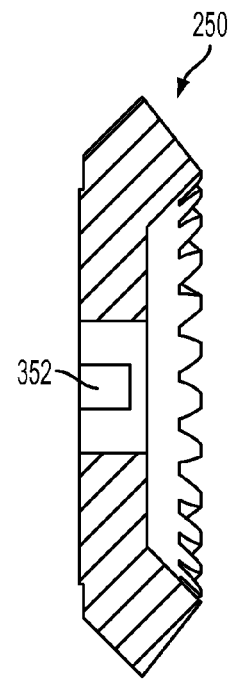
FIG. 23B is a side elevation cross sectional view of the output bevel gear taken along the line 23B-23B of FIG. 23A.

Jack screw 252 is pinned to output bevel gear 250 through an elongated slot 356 in shaft 358 (FIG. 22) of screw 252 via drive pin 354, with drive pin 354 correspondingly engaged in slot 352 of output bevel 250 (FIGS. 23A and 23B). Slot 356 allows jack screw 252 to be vertical displaced relative to output bevel gear 250, with an approximate 0.2 inch movement in the illustrated embodiment. Upon the lower foot, such as a foot 36, of landing gear 230 contacting a support surface when the lower leg is extended downward, jack screw 252 axially translates upward relative to bevel gear 250 whereby an engagement member comprising an actuator member or lock or stop member formed as a boss 353 on the upper end or upper portion 334 of the elongate shaft member 358 of jack screw 252 will engage with one of the external circumferentially disposed detents 249 on ring gear 246. The engagement of a lock or stop member, which is formed as boss 353 in the illustrated embodiment with a selected detent 249 causes ring gear 246 to stop rotating, thus enabling gear assembly 242 to shift from the high gear setting to the low gear setting. It should be readily appreciated that alternative configurations of stop members and/or receptacles may be employed, including the use of stop members on the circumferential exterior of a ring gear for engagement with one or more receptacles on a shaft member.

Figure 24:
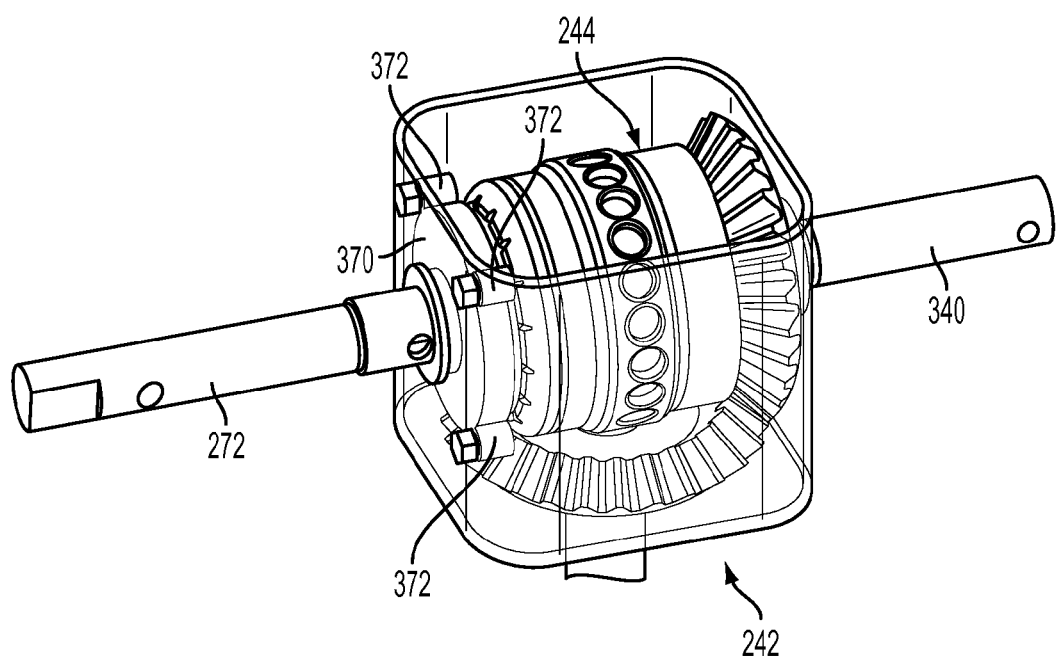
FIG. 24 is a partial perspective view of another alternative embodiment of the gear assembly for landing gear in accordance with the present invention.

When ring gear 246 is caused to stop rotating, clutch plate 224 is caused to disengage with front plate 299 of ring gear 246 via a biasing member, which in the embodiment of FIG. 3 comprises a wave spring 320. That is, clutch plate 224 is normally biased into engagement with front plate 299 via spring 320, but upon rotation of ring gear 246 stopping the torque resistance of rotation of clutch plate 224 to front plate 299 increases whereby clutch plate 224 disengages from front plate 299 whereby input shaft 272 can continue to rotate with planetary gear system 244 then beginning to operate within interior 260 of ring gear 246, thereby providing the gear reduction necessary for the user to operate landing gear 30 under load. Automatic shifting is thereby accomplished or reacted to in connection with a sensed or changed torque. Alternative biasing members or arrangements may be employed for engaging/disengaging clutch plate 225 with front plate 299 of ring gear 246. For example, as shown in FIG. 24, a biasing plate or cup member 370 positioned between an interior surface of housing 232 and clutch plate 225 may be used, with plate member 370 being mounted via a plurality of compression springs 372 that press against the interior surface of housing 232. Biasing plate 370 causes clutch plate 225 to engage with front plate 299 for operating in the high gear setting, with clutch plate 225 disengaging from front plate 299 for operation in the low gear setting.

As shown, planetary gear system 244, spring 320, clutch plate 225, input bevel gear 248, output bevel gear 250, and at least a portion of jack screw 252 are all contained within leg housing 232, with leg housing 232 including two oppositely disposed holes for receiving input shaft 272 and output shaft 340, respectively, where each such hole receives a bearing member 374 for distributing the load to housing 232.

The telescoping legs of the landing gear may be extended when the crank is turned clockwise, with the high gear ratio being minimized to rapidly extend and retract the telescoping leg and thereby minimize the amount of time required for turning of the crank, and the low gear ratio being maximized to decrease the required torque input to facilitate turning of the crank when under loaded conditions. In a particular embodiment, for example, the high and low gear ratios were 2.5 turns and 34 turns, respectively, for a one-inch displacement of the telescoping leg.

Thus, in the above discussed embodiment of FIGS. 16-23B, planetary gear system 244 is actuated by two simultaneous interactions of ring gear 246 to achieve automatic shifting. When gear assembly 242 is in high gear, clutch plate 225 engages ring gear 246 to allow ring gear 246 to rotate, causing planetary assembly 244 to concurrently rotate when an operator turns the crank, whereby there is no reduction because the bevel gears 248, 250 power jack screw 252 by direct drive. (See FIG. 18A). Upon the foot of the telescoping leg contacting the support surface, gear assembly 242 automatically shifts into low gear by jack screw 252 translating axially and engaging ring gear 246 thereby preventing rotation of ring gear 246 while also disengaging ring gear 246 from clutch plate 225. Jack screw 252 thereby operates as an actuator of gear assembly 242, with planetary gear system 244 then operating to provide the gear reduction needed under loaded conditions. (See FIG. 18B).

Figures 25, 26:
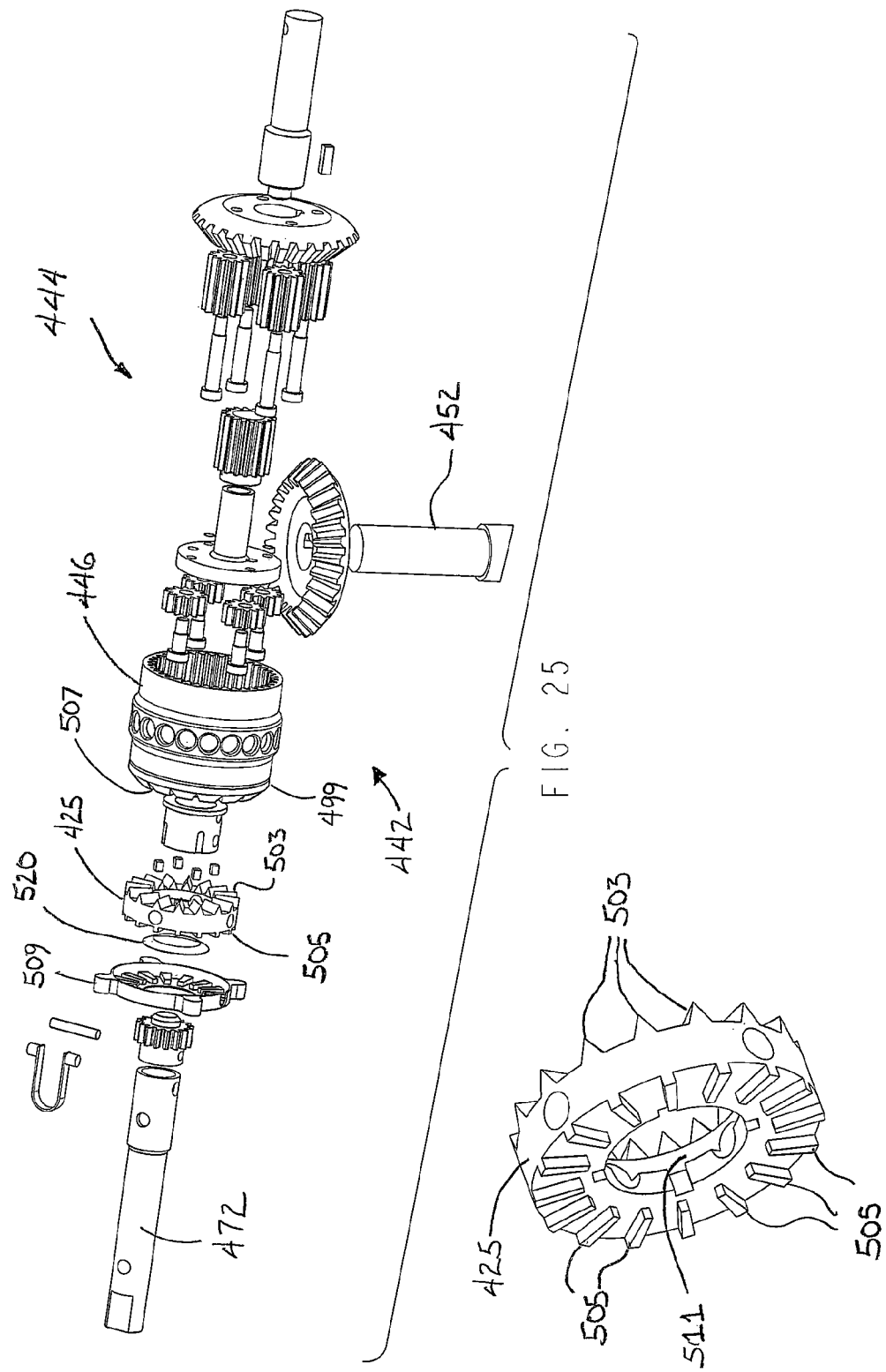
FIG. 25 is an exploded perspective view of another embodiment of a gear assembly for a landing gear in accordance with the present invention.
FIG. 26 is a back side perspective view of an engagement member of the gear assembly of FIG. 25 that is configured as a lock cup.

Referring now to FIGS. 25 and 26, an alternative gear assembly 442 in accordance with the present invention for use in a landing gear is disclosed that is similar in construction and operation to gear assemblies 42 and 242 discussed above. Like components of gear assembly 442 relative to gear assembly 242 are labeled with similar reference numerals, but with 200 added to the reference numerals of gear assembly 242. Due to their similarities and the above description, not all of the construction and operation of gear assembly 442 need be discussed herein.

Gear assembly 442 includes a planetary gear assembly 444 including a ring gear 446. Ring gear 446, however, is not engaged by lift screw 452 to stop rotation thereof. Rather, gear assembly 442 includes an engagement member configured as a clutch plate 425 that includes teeth 503 on one side for engaging with grooves 507 on front plate 499 of ring gear 446, as well as teeth 505 on an opposite side for engaging with a lock member or lock cup 509.

In the high gear or setting, the bevel spring 520 holds the clutch plate 425 into the angular grooves 507 in the ring gear 446 face plate 499 while also being engaged with the input shaft 472 via keys, as torque increases the clutch plate 425 rides along the angular surface of the ring face plate 499 creating axial movement of the clutch plate 425. The axial movement engages the lock teeth 505 on the backside of the clutch plate 425 with the lock cup 509. As this axial translation is happening the keys are disengaged by means of a clearance groove 511 in the clutch plate 425. This allows the clutch plate 425 to lock the ring gear 446 while releasing the keyed input shaft 472 to facilitate the low gear or setting. Thus, automatic shifting occurs via a change in torque. Alternatively, a cam or the like may be employed to shift clutch plate 425.

A method of automatically shifting a landing gear in accordance with the present invention thus comprises axially displacing an elevation member within a housing member by raising or lowering an associated telescopic leg into contact with a support surface, and preventing rotation of a ring gear of a planetary gear assembly as a result thereof. The method further including moving an actuator by the axially displacing of the elevation member, and in turn moving a shift member to prevent rotation of the ring gear.

It should be appreciated, however, that alternative constructions may be employed within the scope of the present invention. For example, a planetary gear system may be provided with more or fewer primary and/or secondary planet gears. Various flanges, gussets or brackets (not shown) may also be used for connecting landing gear to a semitrailer, as may be required. Still further, rather than a hand crank, rotational input motion may be provided by an electric or hydraulic motor. Additional changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A multi-speed landing gear, said landing gear comprising:
  a housing member and a telescoping leg member connected with said housing member;
  an elevation member interconnected with said housing member and said leg member;

a gear assembly configured to extend and retract said leg member, said gear assembly including a ring gear arranged to rotate about an axis that is transverse to the telescopic orientation of said leg member with said gear assembly configured to operate in a high speed setting and a low speed setting, with said gear assembly configured to automatically shift from the high speed setting to the low speed setting; and an actuator, said actuator being operative to selectively prevent or allow rotation of said ring gear to enable said gear assembly to operate in the low speed setting or the high speed setting, with said elevation member configured to selectively move relative to said housing member when said leg member is lowered into or out of contact with the support surface to cause said actuator to selectively prevent or allow rotation of said ring gear of said gear assembly.

2. The multi-speed landing gear of claim 1, wherein said gear assembly comprises a planetary gear assembly.

3. The multi-speed landing gear of claim 2, wherein said planetary gear assembly includes a primary sun gear and primary planet gears with said primary planet gears being mounted on primary axles, and wherein said ring gear includes internal gear teeth with said primary planet gears being engaged with said internal gear teeth.

4. The multi-speed landing gear of claim 3, further including a first drive gear and wherein said planetary gear assembly includes a secondary sun gear and secondary planet gears with said secondary planet gears being mounted on secondary axles, and wherein said secondary axles are configured to impart rotational motion to said first drive gear.

5. The multi-speed landing gear of claim 4, wherein said secondary axles are mounted to said first drive gear whereby said first drive gear comprises a secondary carrier of said planetary gear assembly.

6. The multi-speed landing gear of claim 4, further including an output drive gear that drives extension and retraction of said leg member, wherein said first drive gear comprises an input drive gear and wherein said input drive gear meshes with said output drive gear.

7. The multi-speed landing gear of claim 4, wherein said secondary planet gears engage with said internal gear teeth of said ring gear.

8. The multi-speed landing gear of claim 4, further including a gear member to which said primary axles are mounted, and wherein said gear member includes said secondary sun gear whereby said gear member comprises a primary planet gear carrier combined with said secondary sun gear.

9. The multi-speed landing gear of claim 1, wherein said gear assembly acts on said elevation member to extend and retract said leg member, said elevation member including an upper portion that is configured to selectively move relative to said housing member between a first position and a second position when said leg member is lowered into or raised out of contact with a support surface to cause said actuator to selectively prevent or allow rotation of said ring gear.

10. The multi-speed landing gear of claim 9, further including a shift member connected with said actuator, said shift member being selectively moveable by said actuator to selectively prevent or allow rotation of said ring gear.

11. The multi-speed landing gear of claim 10, wherein said upper portion of said elevation member contacts said actuator to selectively move said shift member.

12. The multi-speed landing gear of claim 10, wherein said upper portion of said elevation member moves between said first position and said second position in a direction axially aligned with said housing member, and said shift member moves transverse to the axial orientation of said housing member.

13. The multi-speed landing gear of claim 1, wherein said actuator is configured to prevent rotation of said ring gear to place said gear assembly in the low speed setting.

14. The multi-speed landing gear of claim 1, further including an engagement member biased into engagement with said ring gear when said gear assembly is operating in either the high speed setting or the low speed setting and biased out of engagement with said ring gear when said gear assembly is operating in the other of the high speed setting or the low speed setting, and wherein said engagement member is configured to be biased into or out of engagement with said ring member via the torque required to extend or retract said leg member.

15. A multi-speed landing gear, said landing gear comprising:
a housing member and a telescoping leg member connected with said housing member;
an elevation member interconnected with said housing member and said leg member;
a gear assembly, said gear assembly configured to act on said elevation member to extend and retract said leg member, and configured to operate in a high speed setting and a low speed setting and automatically shift from the high speed setting to the low speed setting when said leg member is lowered into contact with a support surface and automatically shift from the low speed setting to the high speed setting when said leg member is raised out of contact with the support surface, with said gear assembly comprising a planetary gear assembly, with said planetary gear assembly arranged to rotate about an axis that is transverse to the telescopic orientation of said leg member; and
an actuator, said actuator being operative to selectively prevent or allow rotation of a component of said gear assembly to enable said gear assembly to operate in the low speed setting or the high speed setting, with said elevation member configured to selectively move relative to said housing member when said leg member is lowered into or out of contact with the support surface to cause said actuator to selectively prevent or allow rotation of said component of said gear assembly.

16. The multi-speed landing gear of claim 15, wherein said gear assembly further includes an input drive gear operatively engaged with an output drive gear, and wherein said output drive gear is further engaged with said elevation member, and wherein said planetary gear assembly includes a sun gear and planet gears with said planet gears being disposed on axles mounted to said input drive gear.

17. The multi-speed landing gear of claim 16, wherein said component of said gear assembly comprises a ring gear, and wherein said sun gear comprises a secondary sun gear and said planet gears comprise secondary planet gears with said planetary gear assembly further including a primary sun gear and primary planet gears, and wherein said ring gear includes internal gear teeth with said primary planet gears and said secondary planet gears being engaged with said internal gear teeth.

18. The multi-speed landing gear of claim 17, further including a gear member that includes a primary carrier with said primary planetary gears being disposed on axles mounted to said primary carrier, and wherein said gear member includes said secondary sun gear.

19. The multi-speed landing gear of claim 15, further including a shift member engaged with said actuator, said shift member being selectively moveable by said actuator to selectively prevent or allow rotation of said component of said gear assembly.

20. The multi-speed landing gear of claim 19, wherein said component of said gear assembly comprises a ring gear, and wherein said shift member is moved in an axial direction that is transverse to the telescopic orientation of said leg member.

21. A multi-speed landing gear, said landing gear comprising:
   a housing member and a telescoping leg member connected with said housing member;
   an elevation screw interconnected with said housing member and said leg member;
   a gear assembly, said gear assembly including an input shaft, an input bevel gear, and an output bevel gear, with said output bevel gear engaged with said elevation screw and configured to extend and retract said leg member based on rotation of said input shaft, said gear assembly being configured to operate in a high speed setting and a low speed setting and automatically shift from the high speed setting to the low speed setting when said leg member is lowered into contact with a support surface and automatically shift from the low speed setting to the high speed setting when said leg member is raised out of contact with the support surface, said gear assembly further including a planetary gear assembly arranged to rotate about an axis that is transverse to the telescopic orientation of said leg member, said planetary gear assembly including a ring gear, a sun gear, and planet gears with said planet gears being disposed on axles mounted to said input drive gear; and
   an actuator, said actuator being operative to selectively prevent or allow rotation of said ring gear to enable said gear assembly to operate in the low speed setting or the high speed setting, with said elevation screw configured to selectively move relative to said housing member when said leg member is lowered into or out of contact with the support surface to cause said actuator to selectively prevent or allow rotation of said ring gear of said gear assembly.

22. The multi-speed landing gear of claim 21, further including a shift member engaged with said actuator and said ring gear, said shift member being selectively moveable by said actuator to selectively prevent or allow rotation of said ring gear.

23. The multi-speed landing gear of claim 22, further including a lock member, said lock member adapted to receive said shift member when moved by said actuator to prevent rotation of said ring gear.

24. The multi-speed landing gear of claim 21, wherein said elevation screw is configured to axially translate relative to said housing member when said leg member is lowered into contact and raised out of contact with a support surface, and wherein said elevation screw contacts said actuator and is configured to move said actuator when said leg member is lowered into contact and raised out of contact with the support surface to selectively move said shift member.

* * * * *